United States Patent
Nagai

(10) Patent No.: US 10,008,724 B2
(45) Date of Patent: Jun. 26, 2018

(54) BINDER FOR POWER STORAGE DEVICE ELECTRODE

(71) Applicant: SEKISUI CHEMICAL CO., LTD., Osaka (JP)

(72) Inventor: Yasuharu Nagai, Osaka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 33 days.

(21) Appl. No.: 15/121,109

(22) PCT Filed: Mar. 18, 2015

(86) PCT No.: PCT/JP2015/058081
§ 371 (c)(1),
(2) Date: Aug. 24, 2016

(87) PCT Pub. No.: WO2015/146747
PCT Pub. Date: Oct. 1, 2015

(65) Prior Publication Data
US 2017/0018778 A1 Jan. 19, 2017

(30) Foreign Application Priority Data

Mar. 27, 2014 (JP) ................................ 2014-066533

(51) Int. Cl.
| | |
|---|---|
| H01M 4/62 | (2006.01) |
| C08L 29/14 | (2006.01) |
| H01M 4/13 | (2010.01) |
| H01G 11/30 | (2013.01) |
| H01M 4/131 | (2010.01) |
| H01M 4/133 | (2010.01) |
| H01M 4/505 | (2010.01) |
| H01M 4/525 | (2010.01) |
| H01M 4/587 | (2010.01) |
| H01M 10/0525 | (2010.01) |

(52) U.S. Cl.
CPC ............ *H01M 4/622* (2013.01); *C08L 29/14* (2013.01); *H01G 11/30* (2013.01); *H01M 4/13* (2013.01); *H01M 4/131* (2013.01); *H01M 4/133* (2013.01); *H01M 4/505* (2013.01); *H01M 4/525* (2013.01); *H01M 4/587* (2013.01); *H01M 10/0525* (2013.01); *C08L 2201/54* (2013.01); *C08L 2203/20* (2013.01)

(58) Field of Classification Search
CPC ...... H01M 4/622; H01M 4/133; H01M 4/587; H01M 4/525; H01M 4/131; H01M 4/505; H01M 10/0525; H01M 4/13; H01G 11/30; C08L 29/14; C08L 2203/20; C08L 2201/54
See application file for complete search history.

(56) References Cited

U.S. PATENT DOCUMENTS

| | | | | |
|---|---|---|---|---|
| 6,121,349 | A * | 9/2000 | Fischer ................... | C08F 8/00 523/409 |
| 2004/0157078 | A1* | 8/2004 | Yoshida ............... | B41M 5/5254 428/524 |
| 2010/0112480 | A1 | 5/2010 | Hirose et al. | |
| 2013/0225741 | A1* | 8/2013 | Ootsuki ................ | C09D 11/00 524/379 |
| 2015/0240018 | A1* | 8/2015 | Nagai .................... | C08K 5/103 524/557 |
| 2015/0240067 | A1* | 8/2015 | Nagai ................... | C08F 261/12 525/221 |
| 2015/0333333 | A1* | 11/2015 | Mesuda ................ | H01M 4/623 252/182.1 |
| 2016/0053102 | A1* | 2/2016 | Asanuma ............... | C08L 29/14 428/437 |
| 2017/0037271 | A1* | 2/2017 | Kobayashi ............ | H01G 4/008 |

FOREIGN PATENT DOCUMENTS

| | | |
|---|---|---|
| JP | 57-177005 | 10/1982 |
| JP | 5-74461 | 3/1993 |
| JP | 6-206930 | 7/1994 |
| JP | 2009-206079 | 9/2009 |

(Continued)

OTHER PUBLICATIONS

Extended European Search Report dated Aug. 29, 2017 in European Application No. 15769240.1.
International Search Report dated Jun. 16, 2015 in corresponding International (PCT) Application No. PCT/JP2015/058081.
Office Action dated Feb. 6, 2018 in European Application No. 15769240.1.

*Primary Examiner* — Stewart A Fraser
(74) *Attorney, Agent, or Firm* — Wenderoth, Lind & Ponack, L.L.P.

(57) ABSTRACT

The present invention aims to provide a binder for an electrode of a power storage device which is excellent in dispersibility of an active material and adhesion, capable of improving the electrode density of an electrode to be obtained, provided with high resistance against an electrolyte, and capable of producing a high-capacity lithium secondary battery even when the amount thereof is small. The present invention also aims to provide a composition for an electrode of a power storage device, an electrode of a power storage device, and a power storage device each produced using the binder for an electrode of a power storage device. The present invention relates to a binder for an electrode of a power storage device, including a polyvinyl acetal-based resin dispersion containing particles of a polyvinyl acetal-based resin dispersed in an aqueous medium, the polyvinyl acetal-based resin having a hydroxy group content of 30 to 60 mol %.

8 Claims, No Drawings

(56) References Cited

FOREIGN PATENT DOCUMENTS

| | | |
|---|---|---|
| JP | 2012-195289 | 10/2012 |
| JP | 2013-178962 | 9/2013 |
| JP | 2015-086383 | 5/2015 |
| JP | 2015-088487 | 5/2015 |
| WO | 2008/126921 | 10/2008 |

* cited by examiner

BINDER FOR POWER STORAGE DEVICE ELECTRODE

TECHNICAL FIELD

The present invention relates to a binder for an electrode of a power storage device which is excellent in dispersibility of an active material and adhesion, capable of improving the electrode density of an electrode to be obtained, provided with high resistance against an electrolyte, and capable of producing a high-capacity lithium secondary battery even when the amount thereof is small.

The present invention also relates to a composition for an electrode of a power storage device, an electrode of a power storage device, and a power storage device each produced using the binder for an electrode of a power storage device.

BACKGROUND ART

Recent spread of mobile electronic devices such as mobile video cameras and mobile PCs has rapidly increased demand for secondary batteries as portable power sources. A demand for downsizing, weight reduction and higher energy density of such secondary batteries is strong.

Conventionally, secondary batteries capable of being repeatedly charged/discharged are mostly lead batteries, nickel-cadmium batteries, and the like. Such batteries have excellent charge/discharge characteristics but are not enough as portable power sources for mobile electronic devices in terms of the weight or energy density thereof.

To solve the above problem, lithium secondary batteries including a lithium or lithium alloy anode are now studied and developed as secondary batteries. Such lithium secondary batteries advantageously have a high energy density, less self-discharge, and a light weight.

Electrodes of lithium secondary batteries are formed commonly by kneading an active material and a binder together with a solvent to give a slurry containing the active material dispersed therein, applying the slurry onto a current collector by the doctor blade method or the like, and drying the applied slurry into a thin film.

At the present, fluororesins typified by polyvinylidene fluoride (PVDF) are most widely used as binders for electrodes (anodes) of lithium secondary batteries.

Polyvinylidene fluoride is however less likely to be dissolved in a solvent upon production of a slurry for an electrode, which significantly lowers the production efficiency.

To solve this problem, N-methylpyrrolidone, which dissolves polyvinylidene fluoride therein, is commonly used as a solvent for slurry. N-methylpyrrolidone however has a high boiling point, which requires a large amount of heat energy in the step of drying the slurry. In addition, undried N-methylpyrrolidone may be left in the electrode to lower the battery performance.

An aqueous slurry containing water as a solvent is now considered to be used as a slurry for electrodes including cathodes and anodes. In this method, carboxymethyl cellulose is commonly used as a water-soluble binder resin.

In the case of using carboxymethyl cellulose, however, an ability of binding the active material or adhesion to a current collector is markedly poor due to insufficient flexibility of the resin.

Patent Literature 1 discloses a method of dispersing styrene/butadiene latex as a binder. In this case, however, since an excessive amount of an organic component is added, the amount of the active material is relatively reduced to lower the capacity of the battery.

CITATION LIST

Patent Literature

Patent Literature 1: JP 05-74461 A

SUMMARY OF INVENTION

Technical Problem

The present invention aims to provide a binder for an electrode of a power storage device which is excellent in dispersibility of an active material and adhesion, capable of improving the electrode density of an electrode to be obtained, provided with high resistance against an electrolyte, and capable of producing a high-capacity lithium secondary battery even when the amount thereof is small. The present invention also provides a composition for an electrode of a power storage device, an electrode of a power storage device, and a power storage device each produced using the binder for an electrode of a power storage device.

Solution to Problem

The present invention relates to a binder for an electrode of a power storage device, including a polyvinyl acetal-based resin dispersion containing particles of a polyvinyl acetal-based resin dispersed in an aqueous medium, the polyvinyl acetal-based resin having a hydroxy group content of 30 to 60 mol %.

The present invention is specifically described in the following.

As a result of the intensive study, the present inventors found out that, when the binder for an electrode of a power storage device is a polyvinyl acetal-based resin dispersion containing particles of a polyvinyl acetal-based resin that contains a specific amount of hydroxy groups dispersed in an aqueous medium, the binder is excellent in dispersibility of an active material and adhesion, capable of improving the electrode density of an electrode to be obtained, provided with high resistance against an electrolyte, and capable of producing a high-capacity lithium secondary battery even when the amount thereof is small. Thus, the present invention was completed.

The binder for an electrode of a power storage device of the present invention includes a polyvinyl acetal-based resin dispersion containing particles of a polyvinyl acetal-based resin dispersed in an aqueous medium.

In the present invention, the use of a polyvinyl acetal-based resin as a resin component of a binder causes an attractive interaction between particles of the polyvinyl acetal-based resin and an active material, which enables immobilization of the active material with a small amount of the binder.

The particles also have an attractive interaction with a conductive aid, so that the distance between the active material and the conductive aid stays within a predetermined range. Maintenance of an appropriate distance between the active material and the conductive aid significantly improves the dispersibility of the active material.

Additionally, adhesion to a current collector is markedly improved in comparison with the case of using a resin such as PVDF. Moreover, in comparison with the case of using carboxymethyl cellulose, the binder is excellent in dispersibility of the active material and adhesion, and exerts a sufficient effect even when the amount thereof is small.

The binder in the shape of particles does not completely cover the surfaces of the active material or the conductive aid but can partly contact (point contact) them. As a result, contact between an electrolyte and the active material becomes favorable, and conduction of lithium ions is sufficient enough even when a large current is applied upon use of the lithium battery, thereby inhibiting reduction in the battery capacity.

The lower limit of the hydroxy group content of the polyvinyl acetal-based resin included in the particles of the polyvinyl acetal-based resin is 30 mol %, whereas the upper limit thereof is 60 mol %. If the hydroxy group content is less than 30 mol %, the resistance against an electrolyte is insufficient to cause dissolution of a resin component into the electrolyte upon immersion of an electrode in the electrolyte. If the hydroxy group content is more than 60 mol %, synthesis thereof is industrially difficult and the stability of the particles of the polyvinyl acetal-based resin in an aqueous medium is lowered to form aggregation of the particles. In such a case, the active material is hardly sufficiently dispersed.

The lower limit of the hydroxy group content is preferably 35 mol %, and the upper limit thereof is preferably 55 mol %.

The polyvinyl acetal-based resin constituting the particles of the polyvinyl acetal-based resin has a degree of acetalization within a range of 40 to 70 mol % in terms of the total degree of acetalization in either case of using aldehyde alone or mixed aldehyde. If the total degree of acetalization is less than 40 mol %, the flexibility of the resin is significantly lowered and adhesion to a current collector becomes insufficient. If the degree of acetalization is more than 70 mol %, resistance against an electrolyte is insufficient. In such a case, the resin component may be dissolved into an electrolyte upon immersion of an electrode in the electrolyte. The degree of acetalization is more preferably within a range of 45 to 65 mol %.

The lower limit of the acetyl group content of the polyvinyl acetal-based resin constituting the particles of the polyvinyl acetal-based resin is preferably 0.2 mol %, whereas the upper limit thereof is preferably 20 mol %. If the acetyl group content of the polyvinyl acetal-based resin is less than 0.2 mol %, the flexibility is significantly lowered, and adhesion to aluminum foil may be insufficient. If the acetyl group content is more than 20 mol %, resistance against an electrolyte becomes insufficient, and the resin component may be dissolved in an electrolyte upon immersion of an electrode in the electrolyte. The lower limit of the acetyl group content is more preferably 1 mol %.

The lower limit of the degree of polymerization of the polyvinyl acetal-based resin constituting the particles of the polyvinyl acetal-based resin is preferably 250, whereas the upper limit thereof is preferably 4000. If the degree of polymerization is less than 250, resistance against an electrolyte becomes insufficient, and the electrode may be dissolved in an electrolyte, possibly resulting in a short circuit. If the degree of polymerization is more than 4000, adhesion to the active material may be insufficient to lower the discharge capacity of the lithium secondary battery. The lower limit of the degree of polymerization is more preferably 280, and the upper limit thereof is more preferably 3500.

The method for the acetalization is not limited, and a conventionally known method may be employed. Examples thereof include a method of adding any type of aldehyde to a polyvinyl alcohol aqueous solution in the presence of an acid catalyst such as hydrochloric acid.

The aldehyde used in the acetalization is not limited, and examples thereof include formaldehyde (including paraformaldehyde), acetaldehyde (including paracetaldehyde), propionaldehyde, butylaldehyde, amylaldehyde, hexylaldehyde, heptylaldehyde, 2-ethylhexylaldehyde, cyclohexylaldehyde, furfural, glyoxal, glutaraldehyde, benzaldehyde, 2-methylbenzaldehyde, 3-methylbenzaldehyde, 4-methylbenzaldehyde, p-hydroxybenzaldehyde, m-hydroxybenzaldehyde, phenyl acetaldehyde, and β-phenyl propionaldehyde. In particular, preferred are acetaldehyde and butylaldehyde in terms of productivity, characteristic balance, and the like. These aldehydes may be used alone, or in combination of two or more thereof.

The polyvinyl alcohol may be prepared by saponifying a copolymer of the vinyl ester and α-olefin. The ethylenic unsaturated monomer may be further co-polymerized with the saponified copolymer to prepare polyvinyl alcohol containing a component derived from the ethylenic unsaturated monomer. Alternatively, terminal polyvinyl alcohol may be used, which can be prepared by co-polymerizing a vinyl ester monomer such as vinyl acetate with α-olefin in the presence of a thiol compound such as thiolacetic acid or mercaptopropionic acid and then saponifying the resulting copolymer. The α-olefin is not limited, and examples thereof include methylene, ethylene, propylene, isopropylene, butylene, isobutylene, pentylene, hexylene, cyclohexylene, cyclohexyl ethylene, and cyclohexyl propylene.

The polyvinyl acetal-based resin constituting the particles of the polyvinyl acetal-based resin preferably contains an ionic functional group. The ionic functional group is preferably at least one selected from the group consisting of a carboxyl group, a sulfonic acid group, a sulfinic acid group, a sulfenic acid group, a phosphoric acid group, a phosphoric acid group, an amino group, and salts thereof. More preferred are a carboxyl group, a sulfonic acid group, and salts thereof, and still more preferred are a sulfonic acid group and salts thereof. If the polyvinyl acetal-based resin contains an ionic functional group, dispersibility of the particles of the polyvinyl acetal-based resin in a composition for an electrode of a lithium secondary battery can be improved, and dispersibility of the active material and the conductive aid becomes especially excellent.

Examples of the salts include sodium salt and potassium salt.

The polyvinyl acetal-based resin has an ionic functional group content of preferably 0.01 to 1 mmol/g. If the ionic functional group content is less than 0.01 mmol/g, dispersibility of the particles in the composition for an electrode of a lithium secondary battery and dispersibility of the active material and the conductive aid after formation of an electrode may be lowered. If the ionic functional group content is more than 1 mmol/g, durability of the binder after formation of a battery may be lowered to reduce the discharge capacity of the lithium secondary battery. The ionic functional group content of the polyvinyl acetal-based resin is more preferably 0.02 to 0.5 mmol/g. The ionic functional group content can be measured by NMR.

The ionic functional group may be present directly in a polyvinyl acetal-based resin structure or in a graft chain of a graft chain-containing polyvinyl acetal-based resin (hereafter, also simply referred to as a graft copolymer). The ionic functional group is preferably present directly in the polyvinyl acetal-based resin structure because resistance against an electrolyte and dispersibility of the active material and the conductive aid after formation of an electrode are excellent.

If the ionic functional group is present directly in the polyvinyl acetal-based resin structure, the structure is preferably a chain molecular structure in which the ionic functional group is bonded to carbon constituting the main chain of the polyvinyl acetal-based resin or a molecular structure in which the ionic group is bonded via an acetal bond. Particularly preferred is a molecular structure in which the ionic functional group is bonded via an acetal bond.

If the ionic functional group having a structure as mentioned above is present, dispersibility of the particles of the polyvinyl acetal-based resin in the composition for an electrode of a lithium secondary battery is improved, and dispersibility of the active material and the conductive aid after formation of an electrode is especially excellent. Moreover, since degradation of the binder after formation of a battery is inhibited, reduction in the discharge capacity of the lithium secondary battery can be suppressed.

A method for producing a polyvinyl acetal-based resin directly containing the ionic functional group in the polyvinyl acetal-based resin structure is not limited, and examples thereof include a method in which a modified polyvinyl alcohol raw material containing the ionic functional group is reacted with an aldehyde to be acetalized, a method in which a polyvinyl acetal-based resin is prepared and is further reacted with a compound containing an ionic functional group and another functional group that is reactive with the functional group of the polyvinyl acetal-based resin.

If the polyvinyl acetal-based resin contains an ionic functional group via an acetal bond, the acetal bond and the ionic functional group are preferably connected by a linear/cyclic alkyl group or aromatic ring. In particular, they are preferably connected by an alkylene group having 1 or more carbon atoms, a cyclic alkylene group having 5 or more carbon atoms, or an aryl group having 6 or more carbon atoms. Moreover, they are particularly preferably connected by an alkylene group having one or more carbon atoms and an aromatic ring.

With this structure, resistance against an electrolyte and dispersibility of the active material and the conductive aid after formation of an electrode can be improved. Moreover, since degradation of the binder after formation of a battery can be inhibited, reduction in the discharge capacity of the lithium secondary battery can be suppressed.

Examples of the aromatic ring include aromatic rings such as benzene ring and pyridine ring, and condensed polycyclic aromatic rings such as naphthalene ring and anthracene ring.

If the polyvinyl acetal-based resin contains an ionic functional group via an acetal bond, the polyvinyl acetal-based resin preferably has a structural unit including a hydroxy group of Formula (1), a structural unit including an acetyl group of Formula (2), a structural unit including an acetal group of Formula (3), and a structural unit including an ionic functional group-containing acetal group of Formula (4).

With this structure, dispersibility of the particles of the polyvinyl acetal-based resin, and dispersibility of the active material and the conductive aid can be especially improved. Moreover, adhesion to the current collector and resistance against an electrolyte can also be especially improved. Accordingly, reduction in the discharge capacity of the lithium secondary battery can be especially inhibited.

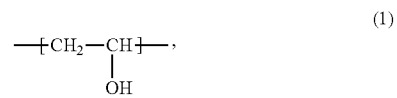

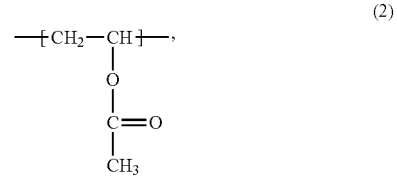

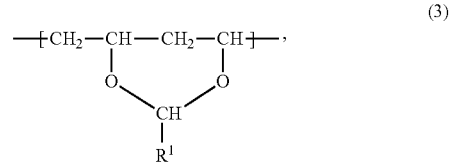

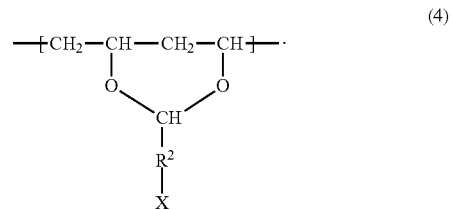

In Formula (3), $R^1$ represents a hydrogen atom or a C1-C20 alkyl group. In Formula (4), $R^2$ represents a C1-C20 alkylene group or an aromatic ring, and X represents an ionic functional group.

The amount of the acetal bond having an ionic functional group in the polyvinyl acetal-based resin is preferably adjusted such that the ionic functional group content of the polyvinyl acetal-based resin falls within the above appropriate range. For setting the ionic functional group content of the polyvinyl acetal-based resin within the above appropriate range, for example, when one acetal bond introduces one ionic functional group, the amount of the acetal bond having an ionic functional group is preferably set to about 0.1 to 10 mol %. When one acetal bond introduces two ionic functional groups, the amount of the acetal bond having an ionic functional group is preferably set to about 0.05 to 5 mol %. For achieving all of high dispersibility of the particles of the polyvinyl acetal-based resin, high flexibility of the resin, and high adhesion to the current collector, the amount of the acetal bond having an ionic functional group in the polyvinyl acetal-based resin is preferably 0.5 to 20 mol % of all the acetal bonds.

Setting the ionic functional group content of the polyvinyl acetal-based resin within the above range improves dispersibility of the particles of the polyvinyl acetal-based resin in the composition for an electrode of a lithium secondary battery. In addition, resistance against an electrolyte and dispersibility of the active material and the conductive aid after formation of an electrode are excellent. Moreover, since degradation of the binder after formation of a battery is inhibited, reduction in the discharge capacity of the lithium secondary battery can be suppressed.

A method for preparing a polyvinyl acetal-based resin having an ionic functional group via an acetal bond in the polyvinyl acetal-based resin structure is not limited. Examples thereof include a method of preliminary reacting a polyvinyl alcohol raw material with an aldehyde having the ionic functional group, followed by acetalization thereof, a method of acetalizing polyvinyl alcohol by mixing an aldehyde raw material with an aldehyde having the ionic functional group upon acetalization of polyvinyl alcohol, and a method of preparing a polyvinyl acetal resin first and reacting it with an aldehyde having the ionic functional group.

Examples of the aldehyde having the ionic functional group include aldehydes having a sulfonic acid group, aldehydes having an amino group, aldehydes having a phosphoric acid group, and aldehydes having a carboxyl group. Specific examples thereof include disodium 4-formylbenzene-1,3-disulfonate, sodium 4-formylbenzene sulfonate, sodium 2-formylbenzene sulfonate, 3-pyridinecarbaldehyde hydrochloride, 4-diethylaminobenzaldehyde hydrochloride, 4-dimethylaminobenzaldehyde hydrochloride, betaine aldehyde chloride, (2-hydroxy-3-oxopropoxy) phosphoric acid, 5-pyridoxal phosphate, terephthalaldehydic acid, and isophthalaldehydic acid.

Particularly preferably, the polyvinyl acetal-based resin has an ionic functional group via an acetal bond, where the ionic functional group is a sulfonic acid group or a salt thereof, and the acetal bond and the ionic functional group are connected by a benzene ring. If the polyvinyl acetal-based resin has such a molecular structure, dispersibility of the particles of the polyvinyl acetal resin in the composition for an electrode of a lithium secondary battery, dispersibility of the active material and the conductive aid after formation of an electrode, and durability of the binder after formation of a battery become particularly excellent.

In the case of having a chain molecular structure in which an ionic functional group is bonded to a carbon atom constituting the main chain of a polymer, the polyvinyl acetal-based resin preferably has a structural unit of Formula (5). If the polyvinyl acetal-based resin has a structural unit of Formula (5), dispersibility of the particles of the polyvinyl acetal-based resin in the composition for an electrode of a lithium secondary battery and durability of the binder after formation of a battery become excellent.

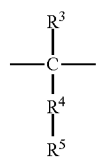

(5)

In Formula (5), C represents a carbon atom in the polymer main chain, $R^3$ represents a hydrogen atom or a methyl group, $R^4$ represents an alkylene group having one or more carbon atoms, and $R^5$ represents an ionic functional group.

Particularly, $R^3$ is preferably a hydrogen atom.

Examples of $R^4$ include a methylene group, an ethylene group, a propylene group, an isopropylene group, a butylene group, an isobutylene group, a sec-butylene group, and a tert-butylene group. Particularly, $R^4$ is preferably a methylene group.

$R^4$ may have a structure substituted by a substituent having a hetero atom. Examples of the substituent include an ester group, an ether group, a sulfide group, an amide group, an amine group, a sulfoxide group, a ketone group, and a hydroxy group.

A method for preparing a polyvinyl acetal-based resin in which an ionic functional group is present directly in the polyvinyl acetal-based resin structure is not limited. Examples thereof include a method of reacting a modified polyvinyl alcohol raw material having the ionic functional group with an aldehyde, followed by acetalization thereof, a method of preparing a polyvinyl acetal resin first and reacting it with a compound having an ionic functional group and another functional group that is reactive with the functional group of the polyvinyl acetal-based resin.

Examples of the method for preparing the modified polyvinyl alcohol having the ionic functional group include a method of co-polymerizing a vinyl ester monomer such as vinyl acetate with a monomer having a structure of Formula (6) and then saponifying an ester moiety of the resulting copolymer resin with an alkali or an acid.

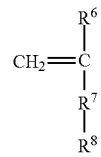

(6)

In Formula (6), $R^6$ represents a hydrogen atom or a methyl group, $R^7$ represents an alkylene group having one or more carbon atoms, and $R^8$ represents an ionic functional group.

The monomer having a structure of Formula (6) is not limited, and examples thereof include: those having a carboxyl group and a polymerizable functional group, such as 3-butenoic acid, 4-pentenoic acid, 5-hexenic acid, and 9-decenoic acid; those having a sulfonic acid group and a polymerizable functional group, such as arylsulfonic acid, 2-methyl-2-propene-1-sulfonic acid, 2-acrylamide-2-methylpropane sulfonic acid, and 3-(methacryloyloxy)propane sulfonic acid; those having an amino group and a polymerizable functional group, such as N,N-diethyl allylamine; and salts of these.

In particular, arylsulfonic acid and salts thereof are preferred. In such a case, dispersibility of the particles of the polyvinyl acetal resin in the composition for an electrode of a lithium secondary battery is improved, and resistance against an electrolyte and dispersibility of the active material and the conductive aid become excellent. Moreover, since degradation of the binder after formation of a battery is inhibited, reduction in the discharge capacity of the lithium secondary battery can be suppressed. Especially, sodium arylsulfonate is preferably used.

These monomers may be used alone, or in combination of two or more thereof.

$R^6$ is particularly preferably a hydrogen atom.

Examples of $R^7$ include a methylene group, an ethylene group, a propylene group, an isopropylene group, a butylene group, an isobutylene group, a sec-butylene group, and a tert-butylene group. Particularly, $R^7$ is preferably a methylene group.

$R^7$ may have a structure substituted by a substituent having a hetero atom. Examples of the substituent include an ester group, an ether group, a sulfide group, an amide group, an amine group, a sulfoxide group, a ketone group, and a hydroxy group.

The amount of the structural unit of Formula (5) in the polyvinyl acetal-based resin is preferably adjusted such that the ionic functional group content of the polyvinyl acetal-based resin falls within the above appropriate range. For setting the ionic functional group content of the polyvinyl acetal resin within the appropriate range, for example, if the structural unit of Formula (5) introduces one ionic functional group, the amount of the structural unit of Formula (5) is preferably set to about 0.05 to 5 mol %. When the structural unit of Formula (5) introduces two ionic functional groups, the amount of the structural unit of Formula (5) is preferably set to about 0.025 to 2.5 mol %.

Setting the ionic functional group content of the polyvinyl acetal-based resin within the above range improves dispersibility of the particles of the polyvinyl acetal resin in the composition for an electrode of a lithium secondary battery. In addition, resistance against an electrolyte and dispersibility of the active material and the conductive aid after formation of an electrode are excellent. Moreover, since degradation of the binder after formation of a battery is inhibited, reduction in the discharge capacity of the lithium secondary battery can be suppressed.

The particles of the polyvinyl acetal-based resin preferably have a volume average particle size of 10 to 500 nm. If the volume average particle size is more than 500 nm, dispersibility of the active material and the conductive aid after formation of an electrode may be lowered to reduce the discharge capacity of the lithium secondary battery. If the volume average particle size is less than 10 nm, the binder may completely cover the surfaces of the active material and the conductive aid. In such a case, the electrolyte hardly contacts the active material, so that the conduction of lithium ions is lowered when a large current is applied to the lithium battery. As a result, the battery capacity may be lowered. The particles of the polyvinyl acetal-based resin have a volume average particle size of more preferably 15 to 300 nm, still more preferably 15 to 200 nm.

The volume average particle size of the particles of the polyvinyl acetal-based resin can be measured with a device such as a laser diffraction/scattering type particle size distribution analyzer, a transmission electron microscope (TEM), or a scanning electron microscope.

Concerning the volume average particle size of the particles of the polyvinyl acetal-based resin, the upper limit of the CV value is preferably 40%. The CV value of more than 40% indicates the presence of particles having a large particle size, and a stable composition for an electrode of a lithium secondary battery may not be obtained due to precipitation of the large-size particles.

The upper limit of the CV value is preferably 35%, more preferably 32%, still more preferably 30%. The CV value is a value in percentage (%) obtained by dividing the standard deviation by the volume average particle size.

The binder for an electrode of a power storage device of the present invention contains an aqueous medium as a dispersing medium.

The use of an aqueous medium as the dispersing medium enables to reduce a residual solvent in an electrode as far as possible, thereby producing a lithium secondary battery.

The binder for an electrode of a power storage device of the present invention may contain only water as an aqueous medium or contain water and a solvent other than water.

The solvent other than water preferably has solubility in water and high volatility, and examples thereof include alcohols such as isopropyl alcohol, normal propyl alcohol, ethanol, and methanol. The solvents may be used alone, or in combination of two or more thereof. The upper limit of the amount of the solvent other than water is preferably 30 parts by weight, more preferably 20 parts by weight relative to 100 parts by weight of water.

The amount of the particles of the polyvinyl acetal-based resin in the binder for an electrode of a power storage device of the present invention is not limited. The lower limit thereof is preferably 2% by weight, whereas the upper limit thereof is preferably 60% by weight. If the amount of the particles of the polyvinyl acetal-based resin is less than 2% by weight, the amount of the particles of the polyvinyl acetal-based resin relative to the amount of the active material is small upon preparation of a composition for an electrode of a power storage device by mixing the binder and the active material, which leads to insufficient adhesion to the current collector. If the amount of the particles of the polyvinyl acetal-based resin is more than 60% by weight, the stability of the particles of the polyvinyl acetal-based resin in the aqueous medium may be lowered to cause aggregation of particles. Accordingly, sufficient dispersion of the active material may become difficult, so that the discharge capacity of the power storage device such as lithium secondary batteries is reduced. The amount of the particles of the polyvinyl acetal-based resin is more preferably 5 to 50% by weight.

The binder for an electrode of a power storage device of the present invention is a binder used for an electrode of a power storage device.

Examples of the power storage device include lithium secondary batteries, electrical double layer capacitors, and lithium ion capacitors. Particularly preferred are lithium secondary batteries and lithium ion capacitors.

A method for producing the binder for an electrode of a power storage device of the present invention is not limited. Examples of the method include: a method including the steps of preparing a polyvinyl acetal-based resin, dissolving the polyvinyl acetal-based resin in an organic solvent that dissolves polyvinyl acetal-based resins, such as tetrahydrofuran, acetone, toluene, methyl ethyl ketone, ethyl acetate, methanol, ethanol, butanol, or isopropyl alcohol, adding a poor solvent such as water little by little, and removing the organic solvent by heating and/or decompression to deposit the polyvinyl acetal-based resin, thereby producing particles; a method including the steps of adding a solution of the polyvinyl acetal-based resin in a large amount of water, and removing the organic solvent optionally by heating and/or decompression to deposit the polyvinyl acetal-based resin, thereby producing particles; and a method including the steps of heating the polyvinyl acetal-based resin at a temperature not lower than the glass transition temperature of the polyvinyl acetal-based resin, and kneading the resin with a kneader or the like while adding water little by little under heating and pressurization.

Preferred is the method including the steps of dissolving the polyvinyl acetal-based resin in an organic solvent and then depositing the polyvinyl acetal-based resin to produce particles because the obtained particles of the polyvinyl acetal-based resin has a small volume average particle size and a narrow particle size distribution.

In the above method, the particles of the polyvinyl acetal-based resin may be, after production and drying thereof, dispersed in an aqueous medium. Alternatively, the solvent used in preparation of the particles of the polyvinyl acetal-based resin may be used as is as an aqueous medium.

The binder for an electrode of a power storage device of the present invention is blended with an active material to give a composition for an electrode of a power storage device. The present invention also encompasses a composition for an electrode of a power storage device containing the binder for an electrode of a power storage device of the present invention and an active material.

The amount of the particles of the polyvinyl acetal-based resin in the composition for an electrode of a power storage device of the present invention is not limited. The lower limit thereof is preferably 0.5 parts by weight, whereas the upper limit thereof is preferably 12 parts by weight relative to 100 parts by weight of the active material. If the amount of the particles of the polyvinyl acetal-based resin is less than 0.5 parts by weight, adhesion to the current collector may be insufficient. If the amount is more than 12 parts by weight, the discharge capacity of the lithium secondary battery may be reduced. The amount is more preferably 1 to 5 parts by weight.

The composition for an electrode of a power storage device of the present invention contains an active material.

The composition for an electrode of a power storage device of the present invention may be used for a cathode or an anode. Moreover, it may be used for both a cathode and an anode. Accordingly, examples of the active material include cathode active materials and anode active materials.

Examples of the cathode active materials include lithium-containing complex metal oxides such as lithium nickel oxides, lithium cobalt oxides, lithium manganese oxides. Specific examples thereof include $LiNiO_2$, $LiCoO_2$, $LiMn_2O_4$, and $LiFeO$.

These may be used alone, or in combination of two or more thereof.

The anode active materials may be those conventionally used as anode active materials for lithium secondary batteries. Examples thereof include natural graphite, artificial graphite, amorphous carbon, carbon black, and those obtainable by adding a hetero element to these compounds. Preferred is graphite, and particularly preferred is spherical natural graphite.

The composition for an electrode of a power storage device of the present invention preferably contains a conductive aid.

The conductive aid is used for realizing high output of a power storage device, and is appropriately selected in accordance with whether it is used for a cathode or an anode.

Examples of the conductive aid include graphite, acetylene black, carbon black, Ketjenblack, and vapor-grown carbon fiber. Preferred among these is acetylene black.

The composition for an electrode of a power storage device of the present invention may optionally contain additives such as a flame retardant auxiliary, a thickener, a defoamer, a leveling agent, and an adhesion imparting agent, in addition to the active material, the conductive aid, the particles of the polyvinyl acetal-based resin, and the aqueous medium. In particular, the composition for an electrode of a power storage device preferably contains a thickener because a coating film thereof becomes uniform upon application of the composition to a current collector.

The method for producing the composition for an electrode of a power storage device of the present invention is not limited, and examples thereof include a method of mixing the active material, the conductive aid, the particles of the polyvinyl acetal-based resin, the aqueous medium, and additives added optionally with a mixer such as a ball mill, a blender mill, or a three-roll mill.

The composition for an electrode of a power storage device of the present invention is applied to a conductive substrate and dried to form an electrode of a power storage device. The present invention also encompasses a power storage device produced using the composition for an electrode of a power storage device.

The method for applying the composition for an electrode of a power storage device of the present invention to a conductive substrate may be any application method, and examples thereof include a method using an extrusion coater, a reverse roller, a doctor blade, or an applicator.

Advantageous Effects of Invention

The present invention can provide a binder for an electrode of a power storage device which is excellent in dispersibility of an active material and adhesion, capable of improving the electrode density of an electrode to be obtained, provided with high resistance against an electrolyte, and capable of producing a high-capacity lithium secondary battery even when the amount thereof is small. The present invention can also provide a composition for an electrode of a power storage device, an electrode of a power storage device, and a power storage device each prepared using the binder for an electrode of a power storage device.

DESCRIPTION OF EMBODIMENTS

The present invention is specifically described with reference to, but not limited to, examples.

(Preparation of Dispersion of Particles 1 of Polyvinyl Acetal-Based Resin)

In a reaction vessel equipped with a thermometer, a stirrer, and a condenser, 20 parts by weight of polyvinyl acetal resin (degree of polymerization of 1000, degree of butyralization of 55.0 mol %, hydroxy group content of 43.6 mol %, acetyl group content of 1.4 mol %) was dissolved in 80 parts by weight of isopropanol. The solution was blended with 1 part by weight of sodium 2-formylbenzene sulfonate and 0.05 parts by weight of 12M concentrated hydrochloric acid, and reacted at 75° C. for four hours. The reaction solution was cooled, and 200 parts by weight of water was dropwise added thereto. Next, the reaction solution was stirred under reduced pressure while its temperature was kept at 30° C. so that isopropanol and water were vaporized. The resulting product was concentrated to a solid content of 20% by weight, thereby preparing a dispersion containing particles 1 (hereafter, also referred to as polyvinyl acetal-based resin particles 1) of the polyvinyl acetal-based resin dispersed therein (amount of particles 1 of polyvinyl acetal-based resin: 20% by weight).

As a result of NMR performed on the obtained polyvinyl acetal-based resin, the degree of butyralization was 54.0 mol %, the hydroxy group content was 42.0 mol %, the acetyl group content was 1.1 mol %, the amount of the ionic functional group contained in the polyvinyl acetal-based resin was 0.2 mmol/g, and the amount of the acetal bond having an ionic functional group was 2.9 mol %. The volume average particle size of the obtained particles 1 of the polyvinyl acetal-based resin measured by a transmission electron microscope (TEM) was 90 nm.

(Preparation of Dispersion of Particles 2 of Polyvinyl Acetal-Based Resin)

In a reaction vessel equipped with a thermometer, a stirrer, and a condenser, 20 parts by weight of polyvinyl acetal resin (degree of polymerization of 2000, degree of butyralization of 46.6 mol %, hydroxy group content of 52.6 mol %, acetyl group content of 0.8 mol %) was dissolved in 80 parts by weight of isopropanol. The solution was blended with 0.5 parts by weight of sodium 2-formylbenzene sulfonate and 0.05 parts by weight of 12M concentrated hydrochloric acid, and reacted at 75° C. for four hours. The reaction solution was cooled, and 200 parts by weight of water was dropwise added thereto. Next, the reaction solution was stirred under reduced pressure while its temperature was kept at 30° C. so that isopropanol and water were vaporized. The resulting product was concentrated to a solid content of 20% by weight, thereby preparing a dispersion containing particles 2 of the polyvinyl acetal-based resin dispersed therein (amount of particles 2 of polyvinyl acetal resin: 20% by weight). As a result of NMR performed on the obtained polyvinyl acetal-based resin, the degree of butyralization was 46.0 mol %, the hydroxy group content was 52.0 mol %, the acetyl group content was 0.5 mol %, the amount of the ionic functional group contained in the polyvinyl acetal-based resin was 0.1 mmol/g, and the amount of the acetal bond having an ionic functional group was 1.5 mol %. The volume average particle size of the obtained particles 2 of the polyvinyl acetal-based resin measured by a TEM was 300 nm.

(Preparation of Dispersion of Particles 3 of Polyvinyl Acetal-Based Resin)

In a reaction vessel equipped with a thermometer, a stirrer, and a condenser, 20 parts by weight of polyvinyl acetal resin (degree of polymerization of 3500, degree of butyralization of 61.0 mol %, hydroxy group content of 38.0 mol %, acetyl group content of 1.0 mol %) was dissolved in 80 parts by weight of methanol. The solution was blended with 2 parts by weight of disodium 4-formylbenzene-1,3-disulfonate and 0.05 parts by weight of 12M concentrated hydrochloric acid, and reacted at 75° C. for four hours. The reaction solution was cooled, and 200 parts by weight of water was dropwise added thereto. Next, the reaction solution was stirred under reduced pressure while its temperature was kept at 30° C. so that methanol and water were vaporized. The resulting product was concentrated to a solid content of 20% by weight, thereby preparing a dispersion containing particles 3 of the polyvinyl acetal-based resin dispersed therein (amount of particles 3 of polyvinyl acetal-based resin: 20% by weight). As a result of NMR performed on the obtained polyvinyl acetal-based resin, the degree of butyralization was 60.0 mol %, the hydroxy group content was 35.0 mol %, the acetyl group content was 0.8 mol %, the amount of the ionic functional group contained in the polyvinyl acetal-based resin was 0.6 mmol/g, and the amount of the acetal bond having an ionic functional group was 4.2 mol. The volume average particle size of the particles 3 of the polyvinyl acetal-based resin measured by a TEM was 30 nm.

(Preparation of Dispersion of Particles 4 of Polyvinyl Acetal-Based Resin)

In a reaction vessel equipped with a thermometer, a stirrer, and a condenser, 20 parts by weight of polyvinyl acetal resin (degree of polymerization of 850, degree of butyralization of 70.9 mol %, hydroxy group content of 26.1 mol %, acetyl group content of 3.0 mol %) was dissolved in 80 parts by weight of isopropanol. The solution was blended with 0.25 parts by weight of sodium 2-formylbenzene sulfonate and 0.05 parts by weight of 12M concentrated hydrochloric acid, and reacted at 75° C. for four hours. The reaction solution was cooled, and 200 parts by weight of water was dropwise added thereto. Next, the reaction solution was stirred under reduced pressure while its temperature was kept at 30° C. so that isopropanol and water were vaporized. The resulting product was concentrated to a solid content of 20% by weight, thereby preparing a dispersion containing particles 4 of the polyvinyl acetal-based resin dispersed therein (amount of particles 4 of polyvinyl acetal-based resin: 20% by weight). As a result of NMR performed on the obtained polyvinyl acetal-based resin, the degree of butyralization was 70.4 mol %, the hydroxy group content was 26.3 mol %, the acetyl group content was 2.6 mol %, the amount of the ionic functional group contained in the polyvinyl acetal-based resin was 0.05 mmol/g, the amount of the acetal bond having an ionic functional group was 0.7 mol %. The volume average particle size of the obtained particles 4 of the polyvinyl acetal-based resin measured by a TEM was 700 nm.

(Preparation of Dispersion of Particles 5 of Polyvinyl Acetal-Based Resin)

In a reaction vessel equipped with a thermometer, a stirrer, and a condenser, 20 parts by weight of polyvinyl acetal resin (degree of polymerization of 1000, degree of butyralization of 46.0 mol %, hydroxy group content of 51.9 mol %, acetyl group content of 2.1 mol %) was dissolved in 80 parts by weight of isopropanol. The solution was blended with 2 parts by weight of terephthalaldehydic acid and 0.05 parts by weight of 12M concentrated hydrochloric acid, and reacted at 75° C. for four hours. The reaction solution was cooled, and 200 parts by weight of water was dropwise added thereto. Next, the reaction solution was stirred under reduced pressure while its temperature was kept at 30° C. so that isopropanol and water were vaporized. The resulting product was concentrated to a solid content of 20% by weight, thereby preparing a dispersion containing particles 5 of the polyvinyl acetal-based resin dispersed therein (amount of particles 5 of polyvinyl acetal-based resin: 20% by weight). As a result of NMR performed on the obtained polyvinyl acetal-based resin, the degree of butyralization was 45.2 mol %, the hydroxy group content was 42.0 mol %, the acetyl group content was 1.8 mol %, the amount of an ionic functional group contained in the polyvinyl acetal-based resin was 1.0 mmol/g, and the amount of the acetal bond having an ionic functional group was 11 mol %.

The volume average particle size of the obtained particles 5 of the polyvinyl acetal-based resin measured by a TEM was 450 nm.

(Preparation of Dispersion of Particles 6 of Polyvinyl Acetal-Based Resin)

In a reaction vessel equipped with a thermometer, a stirrer, and a condenser, 20 parts by weight of polyvinyl acetal resin (degree of polymerization of 1000, degree of butyralization of 46.5 mol %, hydroxy group content of 53.2 mol %, acetyl group content of 0.3 mol %) was dissolved in 80 parts by weight of isopropanol. The solution was blended with 6 parts by weight of disodium 4-formylbenzene-1,3-disulfonate and 0.05 parts by weight of 12M concentrated hydrochloric acid, and reacted at 75° C. for four hours. The reaction solution was cooled, and 200 parts by weight of water was dropwise added thereto. Next, the reaction solution was stirred under reduced pressure while its temperature was kept at 30° C. so that isopropanol and water were vaporized. The resulting product was concentrated to a solid content of 20% by weight, thereby preparing a dispersion containing particles 6 of the polyvinyl acetal-based resin dispersed therein (amount of particles 6 of polyvinyl acetal-based resin: 20% by weight). As a result of NMR performed on the obtained polyvinyl acetal-based resin, the degree of butyralization was 45.8 mol %, the hydroxy group content was 40.0 mol %, the acetyl group content was 0.2 mol %, the amount of the ionic functional group contained in the polyvinyl acetal-based resin was 1.8 mmol/g, and the amount of the acetal bond having an ionic functional group was 14 mol %. The volume average particle size of the obtained particles 6 of the polyvinyl acetal-based resin measured by a TEM was 9 nm.

(Preparation of Dispersion of Particles 7 of Polyvinyl Acetal-Based Resin)

In a reaction vessel equipped with a thermometer, a stirrer, and a condenser, 20 parts by weight of polyvinyl acetal resin (degree of polymerization of 1000, degree of butyralization of 35.5 mol %, hydroxy group content of 40.5 mol %, acetyl group content of 24.0 mol %) was dissolved in 80 parts by weight of isopropanol. The solution was blended with 1 part by weight of sodium 2-formylbenzene sulfonate and 0.05 parts by weight of 12M concentrated hydrochloric acid, and reacted at 75° C. for four hours. The reaction solution was cooled, and 200 parts by weight of water was dropwise added thereto. Next, the reaction solution was stirred under reduced pressure while its temperature was kept at 30° C. so that isopropanol and water were vaporized. The resulting product was concentrated to a solid content of 20% by weight, thereby preparing a dispersion containing particles 7 of the polyvinyl acetal-based resin dispersed therein (amount of particles 7 of polyvinyl acetal-based resin: 20% by weight). As a result of NMR performed on the obtained polyvinyl acetal-based resin, the degree of butyralization was 35.0 mol %, the hydroxy group content was 40.0 mol %, the acetyl group content was 22.0 mol %, the amount of the ionic functional group contained in the polyvinyl acetal-based resin was 0.2 mmol/g, and the amount of the acetal bond having an ionic functional group was 3.0 mol %.

The volume average particle size of the obtained particles 7 of the polyvinyl acetal-based resin measured by a TEM was 200 nm.

(Preparation of Dispersion of Particles 8 of Polyvinyl Acetal-Based Resin)

An amount of 100 parts by weight of polyvinyl alcohol (degree of polymerization of 1000, degree of saponification of 99 mol %) containing 0.5 mol % of sodium arylsulfonate as a copolymer was added to 1000 parts by weight of pure water, and stirred at 90° C. for about two hours to be dissolved therein. The solution was cooled to 40° C., and 80 parts by weight of hydrochloric acid (concentration of 35% by weight) was added thereto. The resulting solution was further cooled to 4° C., and 60 parts by weight of n-butylaldehyde was added thereto. The resulting solution was subjected to an acetalization reaction while the temperature was kept at 4° C., thereby depositing a reaction product.

The reaction was completed while the liquid temperature was kept at 30° C. for three hours. The reaction product was neutralized by a normal method, washed with water, and dried to give white powder of a polyvinyl acetal-based resin. As a result of NMR performed on the obtained polyvinyl acetal-based resin, the degree of butyralization was 54.0 mol %, the hydroxy group content was 44.5 mol %, the acetyl group content was 1 mol %, the amount of an ionic functional group contained in the polyvinyl acetal-based resin was 0.1 mmol/g, the amount of the acetal bond having an ionic functional group was 0 mol %. The obtained polyvinyl acetal-based resin had a chain molecular structure in which an ionic functional group was bonded to a carbon atom in the main chain.

Then, 20 parts by weight of the obtained polyvinyl acetal-based resin was dissolved in 80 parts by weight of isopropanol, and 200 parts by weight of water was dropwise added thereto. Next, the resulting liquid was stirred under reduced pressure while the temperature thereof was kept at 30° C. so that isopropanol and water were vaporized. The resulting solution was concentrated to a solid content of 20% by weight to give a dispersion containing particles 8 of the polyvinyl acetal-based resin dispersed therein (amount of particles 8 of polyvinyl acetal-based resin: 20% by weight). The volume average particle size of the obtained particles 8 of the polyvinyl acetal-based resin measured by a TEM was 60 nm.

(Preparation of Dispersion of Particles 9 of Polyvinyl Acetal-Based Resin)

Into a reaction vessel equipped with a thermometer, a stirrer, a nitrogen inlet tube, and a condenser, 25 parts by weight of polyvinyl acetal resin (degree of polymerization of 1000, degree of butyralization of 54.0 mol %, hydroxy group content of 45.0 mol %, acetyl group content of 1.0 mol %), 1 part by weight of 2-sodium sulfoethyl methacrylate, and 100 parts by weight of dimethyl sulfoxide were charged, and polyvinyl butyral and 2-sodium sulfoethyl methacrylate were dissolved with stirring. Next, nitrogen gas was blown into the reaction vessel for 30 minutes to replace the atmosphere with nitrogen, and the contents of the reaction vessel were heated to 85° C. with stirring.

After 30 minutes, a polymerization initiator solution obtained by diluting 0.5 parts by weight of t-butyl peroxy-2-ethylhexanoate as a polymerization initiator in 5 parts by weight of dimethyl sulfoxide was dropwise added to the reactor over three hours. Then, the resulting solution was further reacted at 85° C. for three hours. The reaction solution was cooled, and then precipitated in water three times. The resulting product was fully dried to give polyvinyl acetal-based resin comprising 2-sodium sulfoethyl methacrylate-grafted polyvinyl acetal resin. As a result of NMR performed on the obtained polyvinyl acetal-based resin, the degree of butyralization was 54.0 mol %, the hydroxy group content was 45.0 mol %, the acetyl group content was 1 mol %, the amount of an ionic functional group contained in the polyvinyl acetal-based resin was 0.1 mmol/g, and the amount of the acetal bond having an ionic functional group was 0 mol %.

Then, 20 parts by weight of the obtained polyvinyl acetal-based resin was dissolved in 80 parts by weight of isopropanol, and 200 parts by weight of water was dropwise added thereto. Next, the reaction solution was stirred under reduced pressure while its temperature was kept at 30° C. so that isopropanol and water were vaporized. The resulting solution was concentrated to a solid content of 20% by weight to give a dispersion containing particles 9 of the polyvinyl acetal-based resin dispersed therein (amount of particles 9 of polyvinyl acetal-based resin: 20% by weight). The volume average particle size of the obtained particles 9 of the polyvinyl acetal-based resin measured by a TEM was 190 nm.

(Preparation of Dispersion of Particles 10 of Polyvinyl Acetal-Based Resin)

In a reaction vessel equipped with a thermometer, a stirrer, and a condenser, 20 parts by weight of polyvinyl acetal resin (degree of polymerization of 1000, degree of butyralization of 67.0 mol %, hydroxy group content of 31.8 mol %, acetyl group content of 1.2 mol %) was dissolved in 80 parts by weight of isopropanol. The solution was blended with 1 part by weight of sodium 2-formylbenzene sulfonate and 0.05 parts by weight of 12M concentrated hydrochloric acid, and reacted at 75° C. for four hours. The reaction solution was cooled, and 200 parts by weight of water was dropwise added thereto. Next, the resulting solution was stirred under reduced pressure while the temperature thereof was kept at 30° C. so that isopropanol and water were vaporized. The resulting solution was concentrated to a solid content of 20% by weight to give a dispersion containing particles 10 of the polyvinyl acetal-based resin dispersed therein (amount of particles 10 of polyvinyl acetal-based resin: 20% by weight). As a result of NMR performed on the obtained polyvinyl acetal-based resin, the degree of butyralization was 66.0 mol %, the hydroxy group content was 30.0 mol %, the acetyl group content was 0.9 mol %, the amount of an ionic functional group contained in the polyvinyl acetal-based resin was 0.2 mmol/g, and the amount of the acetal bond having an ionic functional group was 3.1 mol %.

The volume average particle size of the obtained particles 10 of a polyvinyl acetal-based resin measured by a TEM was 200 nm.

TABLE 1

| | Degree of polymerization | Polyvinyl acetal-based resin | | | | | | |
|---|---|---|---|---|---|---|---|---|
| | | Degree of acetalization (mol %) | Hydroxy group content (mol %) | Acetyl group content (mol %) | Acetal bond having ionic functional group (mol %) | Ionic functional group | Ionic functional group content (mmol/g) | Volume average particle size (nm) |
| Particles 1 of polyvinyl acetal-based resin | 1000 | 54 | 42 | 1.1 | 2.9 | Sulfonate | 0.2 | 90 |
| Particles 2 of polyvinyl acetal-based resin | 2000 | 46 | 52 | 0.5 | 1.5 | Sulfonate | 0.1 | 300 |
| Particles 3 of polyvinyl acetal-based resin | 3500 | 60 | 35 | 0.8 | 4.2 | Sulfonate | 0.6 | 30 |
| Particles 4 of polyvinyl acetal-based resin | 850 | 70.4 | 26.3 | 2.6 | 0.7 | Sulfonate | 0.05 | 700 |
| Particles 5 of polyvinyl acetal-based resin | 1000 | 45.2 | 42 | 1.8 | 11 | Carboxylic acid | 1 | 450 |
| Particles 6 of polyvinyl acetal-based resin | 1000 | 45.8 | 40 | 0.2 | 14 | Sulfonate | 1.8 | 9 |
| Particles 7 of polyvinyl acetal-based resin | 1000 | 35 | 40 | 22 | 3 | Sulfonate | 0.2 | 200 |
| Particles 8 of polyvinyl acetal-based resin | 1000 | 54 | 44.5 | 1 | 0 | Sulfonate | 0.1 | 60 |
| Particles 9 of polyvinyl acetal-based resin | 1000 | 54 | 45 | 1 | 0 | Sulfonate | 0.1 | 190 |
| Particles 10 of polyvinyl acetal-based resin | 1000 | 66 | 30 | 0.9 | 3.1 | Sulfonate | 0.2 | 200 |

Example 1

Preparation of Composition for Cathode of Lithium Secondary Battery

An amount of 10 parts by weight of the obtained dispersion of the particles 1 of the polyvinyl acetal-based resin as a binder was blended with 90 parts by weight of water to prepare a 2% by weight dispersion of the particles 1 of the polyvinyl acetal-based resin. An amount of 100 parts by weight of the dispersion was blended with 50 parts by weight of lithium manganate (Nippon Chemical Industrial Co., Ltd., CELLSEEDC-5H), as a cathode active material, 4 parts by weight of acetylene black (Denki Kagaku Kogyo Kabushiki Kaisha, DENKA BLACK) as a conductive aid, and 0.5 parts by weight of carboxymethyl cellulose (Aldrich) as a thickener to give a composition for a cathode of a lithium secondary battery.

Examples 2 to 5, 11 to 17

Compositions for a cathode of a lithium secondary battery were prepared in the same manner as in Example 1, except that dispersions of the particles of the polyvinyl acetal-based resin shown in Table 2 were used to change the amount or kind of the particles of the polyvinyl acetal-based resin.

Example 6

Preparation of Composition for Anode of Lithium Secondary Battery

An amount of 10 parts by weight of a dispersion of the particles 1 of the polyvinyl acetal-based resin was blended as a binder with 90 parts by weight of water to prepare a 2% by weight solution of polyvinyl acetal resin. An amount of 100 parts by weight of the solution was blended with 43 parts by weight of spherical natural graphite (Nippon Graphite Industries, ltd., CGB-10) as an anode active material, 4 parts by weight of acetylene black (Denki Kagaku Kogyo Kabushiki Kaisha, DENKA BLACK) as a conductive aid, and 0.5 parts by weight of carboxymethyl cellulose (Aldrich) as a thickener to prepare a composition for an anode of a lithium secondary battery.

Examples 7 to 10, 18 to 24

Compositions for an anode of a lithium secondary battery were prepared in the same manner as in Example 6, except that dispersions of the particles of the polyvinyl acetal-based resin shown in Table 2 were used to change the amount or kind of the particles of the polyvinyl acetal-based resin.

Comparative Example 1

A composition for a cathode of a lithium secondary battery was prepared in the same manner as in Example 1, except that a dispersion of the particles of the polyvinyl acetal-based resin shown in Table 2 was used.

Comparative Example 2

A composition for a cathode of a lithium secondary battery was prepared in the same manner as in Example 1, except that a solution prepared by blending 2 parts by weight of a polyvinyl acetal-based resin (degree of polymerization of 1000, degree of butyralization of 55.0 mol %, hydroxy group content of 43.6 mol %, acetyl group content of 1.4 mol %) with 98 parts by weight of N-methylpyrrolidone was used, instead of the dispersion of the particles of the polyvinyl acetal-based resin.

Comparative Example 3

A composition for a cathode of a lithium secondary battery was prepared in the same manner as in Example 1, except that an aqueous solution of a carboxymethyl cellulose-based resin (Nippon Paper Chemicals Co., Ltd., SUN-ROSE) was used, instead of the dispersion of the particles of the polyvinyl acetal-based resin.

Comparative Example 4

A composition for an anode of a lithium secondary battery was prepared in the same manner as in Example 6, except that a dispersion of the particles of the polyvinyl acetal-based resin shown in Table 2 was used.

Comparative Example 5

A composition for an anode of a lithium secondary battery was prepared in the same manner as in Example 6, except that a solution of a polyvinyl acetal-based resin (degree of polymerization of 1000, degree of butyralization of 55.0 mol %, hydroxy group content of 43.6 mol %, acetyl group content of 1.4 mol %) in N-methylpyrrolidone was used, instead of the dispersion of the particles of the polyvinyl acetal-based resin.

Comparative Example 6

A composition for an anode of a lithium secondary battery was prepared in the same manner as in Example 6, except that an aqueous solution prepared by blending 2 parts by weight of a carboxymethyl cellulose-based resin (Nippon Paper Chemicals Co., Ltd., SUNROSE) with 98 parts by weight of water was used, instead of the dispersion of the particles of the polyvinyl acetal-based resin.
<Evaluation>
The compositions for an electrode (cathode, anode) of a lithium secondary battery obtained in the examples and the comparative examples were evaluated for the following items. Table 2 shows the results.

(1) Adhesion

Regarding the compositions for a cathode of a lithium secondary battery of Examples 1 to 5, 11 to 17 and Comparative Examples 1 to 3, adhesion to aluminum foil was checked. Regarding the compositions for an anode of a lithium secondary battery of Example 6 to 10, 18 to 24 and Comparative Examples 4 to 6, adhesion to copper foil was checked.

(1-1) Adhesion to Aluminum Foil

The composition for an electrode of a lithium secondary battery was applied to aluminum foil (20 μm in thickness) such that the thickness after drying became 20 μm, and dried to give a test sample comprising an electrode formed in the sheet shape on aluminum foil.
The sample was cut to a size of 1 cm in length and 2 cm in width. Using an AUTOGRAPH (Shimadzu Corporation, "AGS-J"), the electrode sheet was pulled upward while the test sample was fixed to measure the peeling force (N) needed for completely peeling the electrode sheet from the aluminum foil.

(1-2) Adhesion to Copper Foil

The peeling force was measured in the same manner as in the "(1-1) Adhesion to aluminum foil" described above, except that the aluminum foil was changed to copper foil (20 μm in thickness).

(2) Dispersibility

An amount of 10 parts by weight of the obtained composition for an electrode of a lithium secondary battery was mixed with 90 parts by weight of water to be diluted. The resulting liquid was stirred with an ultrasonic disperser (SND Co., Ltd., "US-303") for 10 minutes. The average dispersion size was measured using a laser-diffraction type particle size distribution analyzer (Horiba Ltd., LA-910).

(3) Solvent Solubility (Formation of Electrode Sheet)
The compositions for an electrode of a lithium secondary battery obtained in the examples and comparative examples were each applied to a polyethylene terephthalate (PET) film that is preliminary subjected to mold-release treatment, in such a manner that the thickness after drying became 20 μm, and dried to give an electrode sheet.
The electrode sheet was cut to a size of 2-cm square as an electrode sheet sample.
(Evaluation of Dissolution)
The weight of the obtained sample was accurately measured and the weight of the resin contained in the sample was calculated based on the weight ratio of the components contained in the sheet. Then, the sample was put into a mesh bag, and the total weight of the bag and the sample was accurately measured.
The mesh bag containing the sample was immersed in diethyl carbonate that is an electrolyte, and left overnight at room temperature. The mesh bag was then taken out and dried at 150° C. for eight hours so that the solvent was completely dried.
The mesh bag was taken out from the drying apparatus and left to stand at room temperature for one hour. The weight thereof was measured. The dissolution amount of the resin was calculated based on the weight change after the test, and the dissolution rate of the resin was calculated based on the dissolution amount and the weight ratio of the resin calculated in advance. A higher dissolution rate indicates that the resin is likely to be dissolved in the electrolyte.

(4) Evaluation of Battery Performance (4-1) Examples 1 to 5, 11 to 17, Comparative Examples 1 to 3

(a) Formation of Coin Battery
The compositions for a cathode of a lithium secondary battery of Examples 1 to 5, 11 to 17, and Comparative Examples 1 to 3 were each applied to aluminum foil, and dried to form a 0.2-mm-thick layer. A φ 12-mm piece was punched out from the resulting sheet, thereby preparing a cathode layer.
The composition for an anode of a lithium secondary battery of Example 6 was applied to copper foil, and dried to form a 0.2-mm-thick layer. A φ 12-mm piece was punched out from the resulting sheet, thereby preparing an anode layer.
An electrolyte used was a mixed solvent (volume ratio of 1:1) of ethylene carbonate containing $LiPF_6$ (1M) and diethyl carbonate. The cathode layer was impregnated with the electrolyte and placed on a cathode current collector. A porous PP film (separator) impregnated with the electrolyte with a thickness of 25 mm was further placed thereon.
A lithium metal plate serving as an anode layer was further placed on the laminate, and an anode current collector covered with an insulating packing was placed thereon. The laminate was pressurized with a caulking machine to give a sealed type coin battery.

(b) Evaluation of Discharge Capacity and Charge/Discharge Cycle

The discharge capacity and the charge/discharge cycle of the obtained coin batteries were evaluated using a charge/discharge testing device (Hohsen Corp.).

Evaluation of the discharge capacity and the charge/discharge cycle was performed within a voltage range of 3.0 to 4.5 V at a temperature of 20° C. The charge/discharge cycle was evaluated by calculating the ratio of the discharge capacity of the 30th cycle to the initial discharge capacity.

(4-2) Examples 6 to 10, 18 to 24, Comparative Examples 4 to 6

The composition for a cathode of a lithium secondary battery of Example 1 was applied to aluminum foil and dried to form a 0.2-mm-thick layer. A φ 12-mm piece was punched out from the layer, thereby preparing a cathode layer.

The compositions for an anode of a lithium secondary battery of Examples 6 to 10, 18 to 24 and Comparative Examples 4 to 6 were each applied to copper foil and dried to form a 0.2-mm-thick layer. A φ 12-mm piece was punched out from the layer, thereby preparing an anode layer.

Sealed type coin batteries were produced in the same manner as in (4-1), except that the obtained cathode layers and anode layers were used. The discharge capacity and charge/discharge cycle thereof were evaluated. The charge/discharge cycle was evaluated by calculating the ratio of the discharge capacity of the 30th cycle to the initial discharge capacity.

TABLE 2

| | Active material (parts by weight) | | Binder | | Evaluation | | | | |
|---|---|---|---|---|---|---|---|---|---|
| | Lithium manganate | Spherical natural graphite | Kind | Amount (parts by weight) | Peeling force (N) | Average dispersion size (μm) | Dissolution rate (%) | Discharge capacity (mAh/g) | Charge/discharge cycle (%) |
| Example 1 | 50 | — | Particles 1 of polyvinyl acetal-based resin | 2 | 5.4 | 7.3 | 0.8 | 135 | 97 |
| Example 2 | 50 | — | Particles 1 of polyvinyl acetal-based resin | 0.3 | 3.8 | 7.5 | 0.6 | 134 | 96 |
| Example 3 | 50 | — | Particles 1 of polyvinyl acetal-based resin | 6 | 7.2 | 7.4 | 0.9 | 130 | 95 |
| Example 4 | 50 | — | Particles 2 of polyvinyl acetal-based resin | 2 | 4.6 | 7.2 | 0.3 | 140 | 98 |
| Example 5 | 50 | — | Particles 3 of polyvinyl acetal-based resin | 2 | 6.1 | 7.6 | 2.5 | 127 | 94 |
| Example 6 | — | 43 | Particles 1 of polyvinyl acetal-based resin | 2 | 5.2 | 3.7 | 0.8 | 135 | 97 |
| Example 7 | — | 43 | Particles 1 of polyvinyl acetal-based resin | 0.3 | 3.7 | 3.8 | 0.6 | 133 | 96 |
| Example 8 | — | 43 | Particles 1 of polyvinyl acetal-based resin | 5 | 6.5 | 3.9 | 0.9 | 131 | 95 |
| Example 9 | — | 43 | Particles 2 of polyvinyl acetal-based resin | 2 | 4.5 | 4.3 | 0.4 | 136 | 98 |
| Example 10 | — | 43 | Particles 3 of polyvinyl acetal-based resin | 2 | 5.7 | 4.1 | 2.3 | 126 | 95 |
| Example 11 | 50 | — | Particles 2 of polyvinyl acetal-based resin | 15 | 10.3 | 7.9 | 0.3 | 98 | 90 |
| Example 12 | 50 | — | Particles 5 of polyvinyl acetal-based resin | 3 | 3.8 | 8.5 | 0.4 | 95 | 87 |
| Example 13 | 50 | — | Particles 6 of polyvinyl acetal-based resin | 3 | 5.3 | 8.1 | 0.3 | 99 | 91 |
| Example 14 | 50 | — | Particles 7 of polyvinyl acetal-based resin | 3 | 4.9 | 8.3 | 7 | 101 | 85 |
| Example 15 | 50 | — | Particles 8 of polyvinyl acetal-based resin | 3 | 4.9 | 7.8 | 0.6 | 108 | 90 |
| Example 16 | 50 | — | Particles 9 of polyvinyl acetal-based resin | 3 | 4.6 | 8.4 | 0.7 | 105 | 90 |
| Example 17 | 50 | — | Particles 10 of polyvinyl acetal-based resin | 3 | 5.9 | 8.2 | 6 | 103 | 83 |
| Example 18 | — | 43 | Particles 2 of polyvinyl acetal-based resin | 15 | 9.2 | 4.1 | 0.3 | 96 | 89 |
| Example 19 | — | 43 | Particles 5 of polyvinyl acetal-based resin | 3 | 3.3 | 4.8 | 0.4 | 94 | 87 |
| Example 20 | — | 43 | Particles 6 of polyvinyl acetal-based resin | 3 | 4.9 | 4.3 | 0.3 | 95 | 90 |
| Example 21 | — | 43 | Particles 7 of polyvinyl acetal-based resin | 3 | 4.5 | 4.5 | 7 | 98 | 85 |
| Example 22 | — | 43 | Particles 8 of polyvinyl acetal-based resin | 3 | 4.6 | 4 | 0.6 | 106 | 90 |
| Example 23 | — | 43 | Particles 9 of polyvinyl acetal-based resin | 3 | 4.4 | 4.8 | 0.7 | 103 | 90 |
| Example 24 | — | 43 | Particles 10 of polyvinyl acetal-based resin | 3 | 5.2 | 4.4 | 6 | 99 | 83 |
| Comparative Example 1 | 50 | — | Particles 4 of polyvinyl acetal-based resin | 2 | 6.4 | 8.5 | 90.8 | Unmeasurable | Unmeasurable |
| Comparative Example 2 | 50 | — | Polyvinyl acetal-based resin | 2 | 5.1 | 8.1 | 2.1 | 92 | 65 |

TABLE 2-continued

| | Active material (parts by weight) | | Binder | | Evaluation | | | | |
| | | | | | Average | | | | Charge/ |
| | Lithium manganate | Spherical natural graphite | Kind | Amount (parts by weight) | Peeling force (N) | dispersion size (μm) | Dissolution rate (%) | Discharge capacity (mAh/g) | discharge cycle (%) |
|---|---|---|---|---|---|---|---|---|---|
| Comparative Example 3 | 50 | — | Carboxymethyl cellulose-based resin | 2 | 0.7 | 11.5 | 0.5 | 90 | 80 |
| Comparative Example 4 | — | 43 | Particles 4 of polyvinyl acetal-based resin | 2 | 5.9 | 4.9 | 90.1 | Unmeasurable | Unmeasurable |
| Comparative Example 5 | — | 43 | Polyvinyl acetal-based resin | 2 | 4.5 | 4.6 | 2.3 | 89 | 64 |
| Comparative Example 6 | — | 43 | Carboxymethyl cellulose-based resin | 2 | 0.4 | 7.8 | 0.4 | 92 | 79 |

INDUSTRIAL APPLICABILITY

The present invention can provide a binder for an electrode of a power storage device which is excellent in dispersibility of an active material and adhesion, capable of improving the electrode density of an electrode to be obtained, provided with high resistance against an electrolyte, and capable of producing a high-capacity lithium secondary battery even when the amount thereof is small. The present invention can also provide a composition for an electrode of a power storage device, an electrode of a power storage device, and a power storage device each produced using the binder for an electrode of a power storage device.

The invention claimed is:

1. A binder for an electrode of a power storage device, comprising:
   a polyvinyl acetal-based resin dispersion containing particles of a polyvinyl acetal-based resin dispersed in an aqueous medium,
   the polyvinyl acetal-based resin having a hydroxy group content of 30 to 60 mol %,
   wherein the polyvinyl acetal-based resin has a structural unit including a hydroxy group of Formula (1), a structural unit including an acetyl group of Formula (2), a structural unit including an acetal group of Formula (3), and a structural unit including an ionic functional group-containing acetal group of Formula (4):

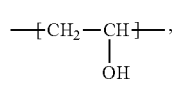
(1)

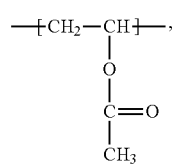
(2)

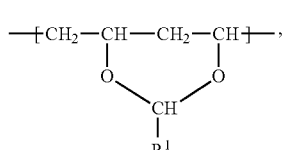
(3)

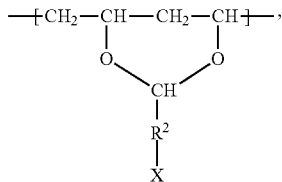
(4)

wherein $R^1$ in Formula (3) represents a hydrogen atom or a C1-C20 alkyl group, $R^2$ in Formula (4) represents a C1-C20 alkylene group or an aromatic ring, and X in Formula (4) represents an ionic functional group.

2. The binder for an electrode of a power storage device according to claim 1,
   wherein the ionic functional group is at least one selected from the group consisting of a carboxyl group, a sulfonic acid group, a sulfinic acid group, a sulfenic acid group, a phosphoric acid group, a phosphonic acid group, an amino group, and salts thereof.

3. The binder for an electrode of a power storage device according to claim 1,
   wherein the polyvinyl acetal-based resin has a degree of polymerization of 250 to 4000.

4. The binder for an electrode of a power storage device according to claim 1,
   wherein the polyvinyl acetal-based resin has an acetyl group content of 0.2 to 20 mol %.

5. The binder for an electrode of a power storage device according to claim 1,
   wherein the particles of the polyvinyl acetal-based resin have a volume average particle size of 10 to 500 nm.

6. A composition for an electrode of a power storage device comprising:
   the binder for an electrode of a power storage device according to claim 1; and
   an active material,
   the composition containing 0.5 to 12 parts by weight of particles of a polyvinyl acetal-based resin relative to 100 parts by weight of the active material.

7. An electrode of a power storage device comprising the composition for an electrode of a power storage device according to claim 6.

8. A power storage device comprising the electrode of a power storage device according to claim 7.

* * * * *